(12) United States Patent
Longobardi et al.

(10) Patent No.: US 10,904,757 B2
(45) Date of Patent: Jan. 26, 2021

(54) REMOTE PRE-AUTHENTICATION OF A USER DEVICE FOR ACCESSING NETWORK SERVICES

(71) Applicant: HCL TECHNOLOGIES ITALY S.P.A, Milan (IT)

(72) Inventors: Giuseppe Longobardi, Rome (IT); Riccardo Pizzutilo, Rome (IT); Ilaria Gorga, Rome (IT); Luigi Presti, Rome (IT)

(73) Assignee: HCL TECHNOLOGIES ITALY S.P.A.

( * ) Notice: Subject to any disclaimer, the term of this patent is extended or adjusted under 35 U.S.C. 154(b) by 286 days.

(21) Appl. No.: 16/227,042

(22) Filed: Dec. 20, 2018

(65) Prior Publication Data

US 2020/0204996 A1    Jun. 25, 2020

(51) Int. Cl.
| | | |
|---|---|---|
| *H04L 29/06* | (2006.01) | |
| *H04W 12/06* | (2009.01) | |
| *H04W 60/00* | (2009.01) | |
| *H04W 84/12* | (2009.01) | |

(52) U.S. Cl.
CPC ....... *H04W 12/0602* (2019.01); *H04W 60/00* (2013.01); *H04W 84/12* (2013.01)

(58) Field of Classification Search
CPC ........................... H04W 12/0602; H04W 60/00
See application file for complete search history.

(56) References Cited

U.S. PATENT DOCUMENTS

| | | | |
|---|---|---|---|
| 8,094,621 B2 | 1/2012 | Guo et al. | |
| 8,429,728 B2 | 4/2013 | Feder et al. | |
| 8,527,768 B2 | 9/2013 | Tsai et al. | |
| 2005/0135624 A1 | 6/2005 | Tsai et al. | |
| 2016/0057691 A1* | 2/2016 | Burton | H04W 76/10 370/331 |
| 2018/0124608 A1 | 5/2018 | Huang | |

OTHER PUBLICATIONS

"Fast Pre-Authentication Based on Proactive Key Distribution for 802.11 Infrastructure Networks" Mohamed Kassab, Abdelfettah Belghith, Jean-Marie Bonnin, Sahbi Sassi Oct. 2015.

* cited by examiner

*Primary Examiner* — Jeffrey C Pwu
*Assistant Examiner* — Thong P Truong
(74) *Attorney, Agent, or Firm* — Hayes Soloway P.C.

(57) ABSTRACT

A system for performing a remote pre-authentication of a user-device for accessing network services of one or more wi-fi network services of one or more wi-fi network providers. A data capturing module captures wi-fi registration data and user registration data. A receiving module receives a trip code relating to a user's travel bookings. An identifying module identifies geographical locations corresponding to the set of travel bookings associated with the user. An auto-populating module auto-populates a set of wi-fi login forms corresponding to the geographical locations. A gathering module gathers real-time location data of the user. An over-riding module over-rides the wi-fi registration process when the user comes within the range of the wi-fi service provider.

11 Claims, 3 Drawing Sheets

REMOTE PRE-AUTHENTICATION OF A USER DEVICE FOR ACCESSING NETWORK SERVICES

PRIORITY INFORMATION

This patent application does not claim priority from any application.

TECHNICAL FIELD

The present subject matter described herein, in general, relates to remote pre-authentication of a user device and more particularly for remote pre-authentication of a user device for accessing network services of one or more wi-fi network providers.

BACKGROUND

Currently, various companies provide free wi-fi access in the premises of airlines, ships, hotels, restaurants, shopping centers, farms and various other public places. However, it often requires the users to fill an online registration form, when they want to access the wi-fi network. Further, the form to establish wi-fi connection is available only when the open network is reachable and accessible.

However, there is no system that can pre-register the user device in a wi-fi network whose network will be accessed by the user in the future and subsequently over-ride the wi-fi network when the device is present within the vicinity of the wi-fi network.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for remote pre-authentication of a user device for accessing network services of one or more wi-fi network providers. The concepts are further described below in the detailed description. This summary is not intended to identify essential features of the claimed subject matter nor is it intended for use in determining or limiting the scope of the claimed subject matter.

In one implementation, a method for performing remote pre-authentication of a user device for accessing network services of one or more wi-fi network providers is disclosed. In order to perform remote pre-authentication of a user device for accessing one or more wi-fi networks, the method may comprise the step of maintaining wi-fi registration data corresponding to a set of wi-fi network providers and user registration data corresponding to a set of users. In one embodiment, each wi-fi network provider may correspond to a geographical location from a set of geographical locations. Further, the method may comprise the step of receiving a trip code from a travel itinerary system that may correspond to a target user from the set of users and a set of travel bookings associated with the target user. Further, the method may comprise the step of identifying a sub-set of geographical locations from the set of geographical locations that may be associated with the set of travel bookings of the target user. Further, the method may comprise the step of auto-populating a set of wi-fi login forms corresponding to each wi-fi network provider that may be associated with the sub-set of geographical locations. The user registration data may be used to auto-populate the wi-fi login forms. Further, the method may comprise the step of gathering a real-time location from a user device of the target user. The real-time location information may correspond to a target geographical location from the sub-set of geographical locations. Further, the method may comprise the step of over-riding a wi-fi registration process of a target wi-fi network provider that may be based on the auto-populated wi-fi login form. The target wi-fi network provider may be associated with the target geographical location. The user may be enabled to access services of the target wi-fi network after over-riding the wi-fi registration process.

In another implementation, a system for remote pre-authentication of a user device for accessing network services of one or more wi-fi network providers is disclosed. The remote pre-authentication system may comprise a processor, and a database may be coupled to the processor. The processor may execute a plurality of modules present in the memory. The plurality of modules may comprise a data capturing module, a receiving module, an identifying module, an auto-populating module, a gathering module, and an over-riding module. The data capturing module may receive wi-fi registration data that may correspond to a set of wi-fi network providers and user registration data that may correspond to a set of users over a database. Each wi-fi network provider may correspond to a geographical location from a set of geographical locations. The receiving module may receive a trip code from a travel itinerary system that may correspond to a target user from the set of users and a set of travel bookings associated with the target user. The identifying module may identify a sub-set of geographical locations from a set of geographical locations. The set of geographical locations may be associated with the set of travel bookings of the target user. The auto-populating module may auto-populate a set of wi-fi login forms that may correspond to each wi-fi network provider. Each wi-fi network provider may be associated with the sub-set of geographical locations. The forms may be auto-populated based on the user registration data. The gathering module may gather real-time location data corresponding to a target geographical location from the sub-set of geographical locations. The over-riding module may over-ride wi-fi registration process of a target wi-fi network provider associated with the target geographical location. The target user is enabled to access services of the target wi-fi network based on the auto-populated wi-fi login form associated with the target wi-fi network provider.

In yet another implementation, non-transitory computer readable medium embodying a program executable in a computing device for performing a remote pre-authentication of a user device for accessing network services of one or more wi-fi network providers is disclosed. The program may comprise a program code for maintaining a Wi-fi registration data that may correspond to a set of wi-fi network providers and user registration data that may correspond to a set of users over a database. The wi-fi network provider may correspond to a geographical location from a set of geographical locations. The program may further comprise a program code for receiving a trip code from a travel itinerary system. The trip code may correspond to a target user from the set of users and the trip code may comprise a set of travel bookings associated with the target user. The program may further comprise a program code for identifying a subset of geographical locations from a set of geographical locations. The subset of geographical locations may be associated with the travel bookings associated with the target user. The program may further comprise a program code for auto-populating a set of wi-fi login forms that may correspond to each wi-fi service provider associated with the sub-set of geographical locations. The set of wi-fi registration forms may be auto-populated based on the user registration data. The program may further comprise a program code for over-riding a wi-fi registration process of a target wi-fi network provider associated with the target geographical location. Further, the over-riding may be facilitated based on the auto-populated wi-fi login form associated with the target wi-fi network provider and enable the target user to access services of the target wi-fi network.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
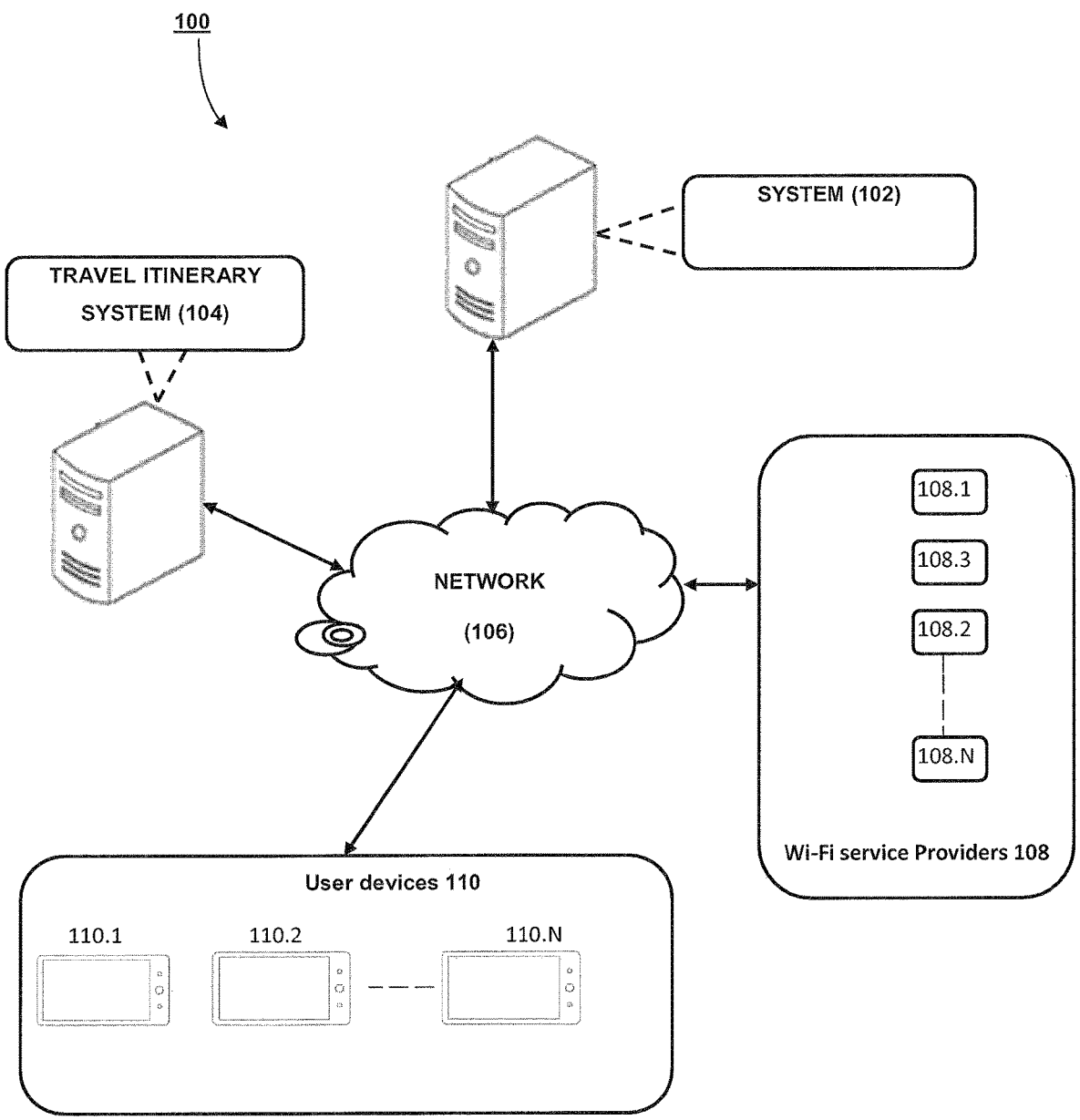
FIG. 1 illustrates a hardware implementation of a system for remote pre-authentication of a user device for accessing network services of one or more wi-fi network providers, in accordance with an embodiment of the present subject matter.

Some embodiments of this disclosure, illustrating all its features, will now be discussed in detail. The words "data capturing," "receiving," "identifying," "gathering," and "over-riding," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention performs a remote pre-authentication of a user device for enabling the user to access one or more wi-fi network providers. For this purpose, a system may register a set of wi-fi network providers for each corresponding geographical location along with their log-in information. Also, user registration information that is required to be filled in the log-in form may be received by the system. In one embodiment, the user registration data may include a set of user defined policies. The user defined policies may include user defined rules for accepting the services of the wi-fi network providers. Further the user defined policies may include but not limited to associated costs for utilizing services of wi-fi network providers, permanence in the wi-fi network provider coverage area for a certain time above a selectable threshold, strength, bandwidth, download and upload capacity of wi-fi network provider.

The system may then receive a trip code associated with the user from a travel itinerary system. The trip code may comprise of a set of travel bookings that the user may book through the travel itinerary system. The system may further identify wi-fi network providers corresponding to a subset of geographical locations that may correspond to the geographical locations of the travel bookings.

The system may subsequently, auto-populate the log-in information of the of wi-fi service providers corresponding to a subset of geographical locations. The data used to auto-populate the log-in information may include the user registration data that may be maintained in the database. In one embodiment, the system may prompt the user over the user device to review and accept terms and conditions associated with the wi-fi network provider before auto-populating the wi-fi login forms associated with the sub-set of geographical locations.

The system may further, gather a real-time location data from a user device to check whether the user is present in the range of the wi-fi network provider. If the system detects the user presence in the range of the wi-fi network provider, the system may over-ride the wi-fi registration process based on the auto-populated wi-fi login form, enabling the user to access the services of the wi-fi network provider.

The system may comprise of a database that manages subscriptions to the wi-fi network providers and subsequently offer an interface to register a set of wi-fi network providers. The wi-fi network providers may include but is not limited airports, hotels and travel connection hubs and an interface that may allow incoming connections from the system. The travel itinerary system is the system that may be owned by travel agencies that may federate all bookings, wherein the bookings may correspond to but is not limited to hotel bookings, flight bookings and local travel bookings. A client application may be installed on the electronic user device. The client application may manage to over-ride wi-fi activation on the electronic device. The client application may further offer an interface to register the user data on the wi-fi network and an interface to insert new booking codes by the travel itinerary system.

The wi-fi network providers may, for the purpose of registering themselves to the system, provide a URL for wi-fi network sign-up with a mask of the user registration data required. The users may register their electronic devices to the system using an application that may be downloaded in the user device. Correspondingly, the system may request the user via the application to fill the user registration data. The user registration data may include a common data and a specific device data. The common data may further include but not limited to a name, a surname and a date of birth. The specific device data may further include but not limited to a MAC address, IMEI and phone number. The user may book his trips via travel itinerary system. The bookings may include but not limited to flight tickets and hotel bookings. Travel itinerary system may generate booking codes for each booking made by the user and may subsequently generate a single trip code for the set of bookings. The trip code may be then received by the application installed by the user. The system may then receive entire set of booking codes corresponding to a single trip code. The system may then create a set of pre-filled log-in forms for each geographical location involved corresponding to the booking codes. The application may then receive a list of dates, time with GPS location and network SID associated with the wi-fi network provider. Subsequently, the system may enable the application to over-ride the device wi-fi registration process directly connecting to the network, when the user may be present in a determined location (GPS), within a correct time frame and under a specific wi-fi network provider SID. While over-riding, the system may directly submit the log-in form transparently without any need to log-in to a homepage of the public wi-fi service. While aspects of described system and method for performing remote pre-authentication of the user device for accessing network services of one or more wi-fi networks may be implemented in any number of different computing systems, environments, and/or configurations, the embodiments are described in the context of the following exemplary reconfigurable convolution engine.

Referring now to FIG. 1, a network implementation 100 of a system 102 for performing remote pre-authentication of the user device for accessing network services of one or more wi-fi networks is disclosed. Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 collectively registers multiple users through one or more user devices 110.1, 110.2 . . . 110.N, collectively referred to as user 110 or stakeholders, hereinafter, or applications residing on the user devices 110. In one implementation, the system 102 may comprise the cloud-based computing environment in which a user may operate individual computing systems configured to execute remotely located applications. Examples of the user devices 110 may include, but are not limited to, an IoT (Internet of Things) device, IoT gateway, portable computer, a personal digital assistant, a handheld device, and a workstation. The user devices 110 are communicatively coupled to the system 102 through a network 106. Further, the system 102 collectively registers multiple wi-fi network providers 108.1, 108.2 . . . 1108.N, collectively referred to as the wi-fi network provider 108 or stakeholders, hereinafter, or applications residing on the user devices 110. In one implementation, the system 102 may comprise the cloud-based computing environment in which a wi-fi network provider may operate individual computing systems configured to execute remotely located applications. Examples of the wi-fi network providers may include, but are not limited to, an IoT device, IoT gateway, portable computer, a personal digital assistant, a handheld device, and a workstation. The wi-fi network provider registration information is communicatively coupled to the system 102 through a network 106. Further the system 102, may communicate with a travel itinerary system 104. Examples of travel itinerary system may include but are not limited to travel agencies, travel websites, applications and software. It may be understood that the travel itinerary system 104 may be implemented in a variety of computing systems, such as a laptop computer, a desktop computer, a notebook, a workstation, a mainframe computer, a server, a network server, a cloud-based computing environment.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
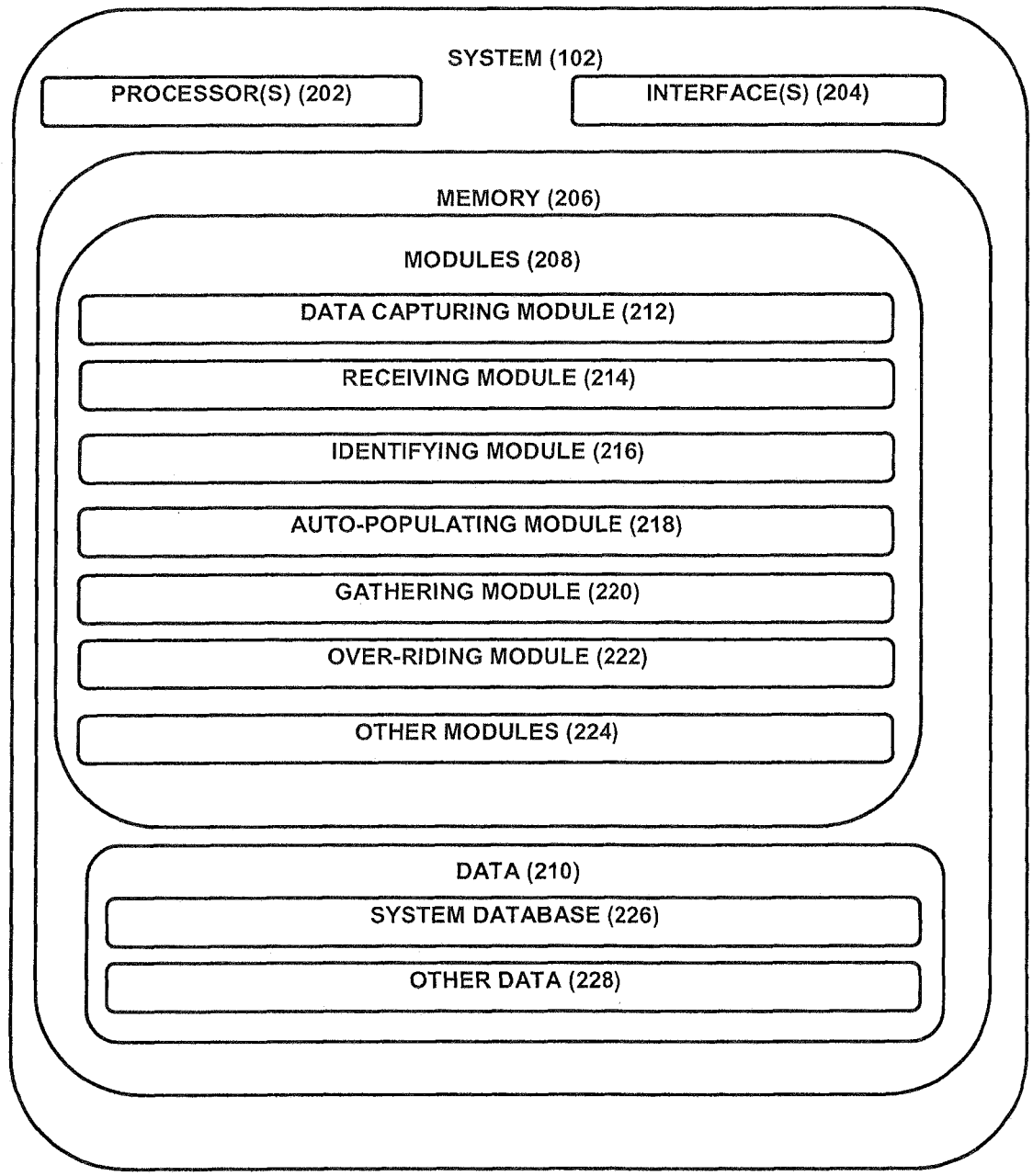
FIG. 2 illustrates the system for remote pre-authentication of a user device for accessing network services of one or more wi-fi network providers, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data capturing module 212, a receiving module 214, an identifying module 216, an auto-populating module 218, a gathering module 220, an over-riding module 222 and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for remote pre-authentication of the user device for accessing network services of one more wi-fi network providers. In order to register the user, at first, a user may use the user device 110 to access the system 102 via the I/O interface 204. The user may register them using the I/O interface 204 to use the system 102. In one aspect, the user may access the I/O interface 204 of the system 102. The system 102 may employ the data capturing module 212, the receiving module 214, the identifying module 216, the auto-populating module 218, the gathering module 220 and the over-riding module 222. The detail functioning of the modules is described below with the help of figures.

In order to facilitate the remote pre-authentication of a user device for accessing network services of one or more wi-fi network providers, the data capturing module 212 receives the wi-fi registration data corresponding to the set of wi-fi network providers and the user data. In one aspect, the wi-fi registration data may comprise of URL for wi-fi network sign-up with a mask of data required, that is the form template. Further, the user data may represent the personal data that may include, but is not limited to name, surname and date of birth. Further, the user data may also include specific device data that may include, but is not limited to, MAC address, IMEI and phone number. The data capturing module 212 stores the data relating to the wi-fi network provider data and the user data.

In one embodiment the data capturing module 212 may receive user defined policies. The user defined policies may include user defined rules related to accepting the services of the wi-fi network providers. Further the user defined policies may include but not limited to associated costs for utilizing services of wi-fi network providers, permanence in the wi-fi network provider coverage area for a certain time above a selectable threshold, strength, bandwidth, download and upload capacity of wi-fi network provider.

Further, the receiving module 214 receives the trip code generated by the travel itinerary system 104. The trip code may comprise of the total number of travel bookings associated with a user.

In order to elucidate the functioning of data capturing module 212 and receiving module 214, consider an example (1) where a user 'A' plans his trip from point 'B' to 'C'. The user 'A' may use the travel itinerary system 104 to make the bookings, where the bookings may include, but are limited to, hotel bookings, flight bookings and other types of commutation. Now, consider the user 'A' starts from point 'B' with a flight, then the user 'A' makes a halt at the connecting airport 'D'. Afterwards the user 'A' makes another flight booking from point 'D' to point 'C'. Then at point 'C', the user makes a hotel booking at hotel 'E'. A single trip code is generated for all the bookings from point 'B' to point 'C'.

Upon maintaining Wi-fi registration data, user registration data and receiving the trip code, the identifying module 216 identifies a sub-set of wi-fi network providers from a set of wi-fi network providers that may be registered by the data capturing module 212. The geographical locations involved in the travel are detected by the identifying module 216. The trip code received by the receiving module 214 may facilitate the identifying module 216 to detect the geographical locations involved during the travel. After detection of geographical locations by the identifying module, it detects the wi-fi network providers that are registered by the data capturing module 212 that the user 110 may access during the travel.

For example, during travel the user may access various hotels, airports and public places that provide wi-fi services. Based on the trip code, the identifying module 216 may detect all the wi-fi services that the user may be able to access during the trip.

Once the sub-set of wi-fi network providers that lie along the trip are detected by the identifying module 216, the auto-populating module 218 may gather all the log-in forms that may be provided by the sub-set of wi-fi network provider. The log-in forms corresponding to wi-fi network providers may be received from the data capturing module 212. After gathering the log-in forms corresponding to the wi-fi network providers, the auto-populating module 218 may auto-populate the log-in forms belonging to the wi-fi network provider with the corresponding user data. In one embodiment, the system 102 may prompt the user over the user device _____ to review and accept terms and conditions associated with the wi-fi network provider before auto-population is performed by the auto-populating module 218.

For example, the wi-fi network provider's log-in form may ask for the following details of the user which may include, but not limited to name, surname, date of birth, e-mail id, log-in data of various social networking sites to verify user's credibility before granting access to the services of the wi-fi network providers. The auto-populating module 218 may use the user data to fill in the log-in form. The user may be asked to review and accept the policies of the wi-fi network provider before auto-population is performed by the auto-populating module 218. The policies of the wi-fi network provider may include but not limited to privacy disclaimers and associated costs to utilize services of the wi-fi network provider.

After the log-in forms of the wi-fi network providers are auto-filled by the auto-populating module 218, the gathering module 220 gathers a real-time location data from the user device. During user's trip, if the user is detected within the range of the wi-fi network provider whose log-in form has been auto-filled, the over-riding module 222 may use the auto-filled log-in forms to over-ride the wi-fi registration process. The wi-fi network provider will correspond to the sub-set of geographical location that may be accessed by the user and that may be present in the trip code.

For example during the trip of the user 'A', the user accesses an airport 'B'. The data capturing module 212 may gather the URL that consists of the wi-fi sign-up form that needs to be filled by the user 'A' to access internet. The gathering module 220 may gather the location from the user device that the user 'A' has entered into the range of the wi-fi services that may be provided by the airport 'B'. After the detection of the location by the gathering module 220 that may confirm that the user 'A' is present in the range of wi-fi network, the over-riding module may access the auto-filled login form corresponding to the wi-fi network provided by airport 'B' and may subsequently over-ride the wi-fi registration process. After over-riding, the user 'A' may be enabled to access the wi-fi services provided by the airport 'B'.

Figure 3:
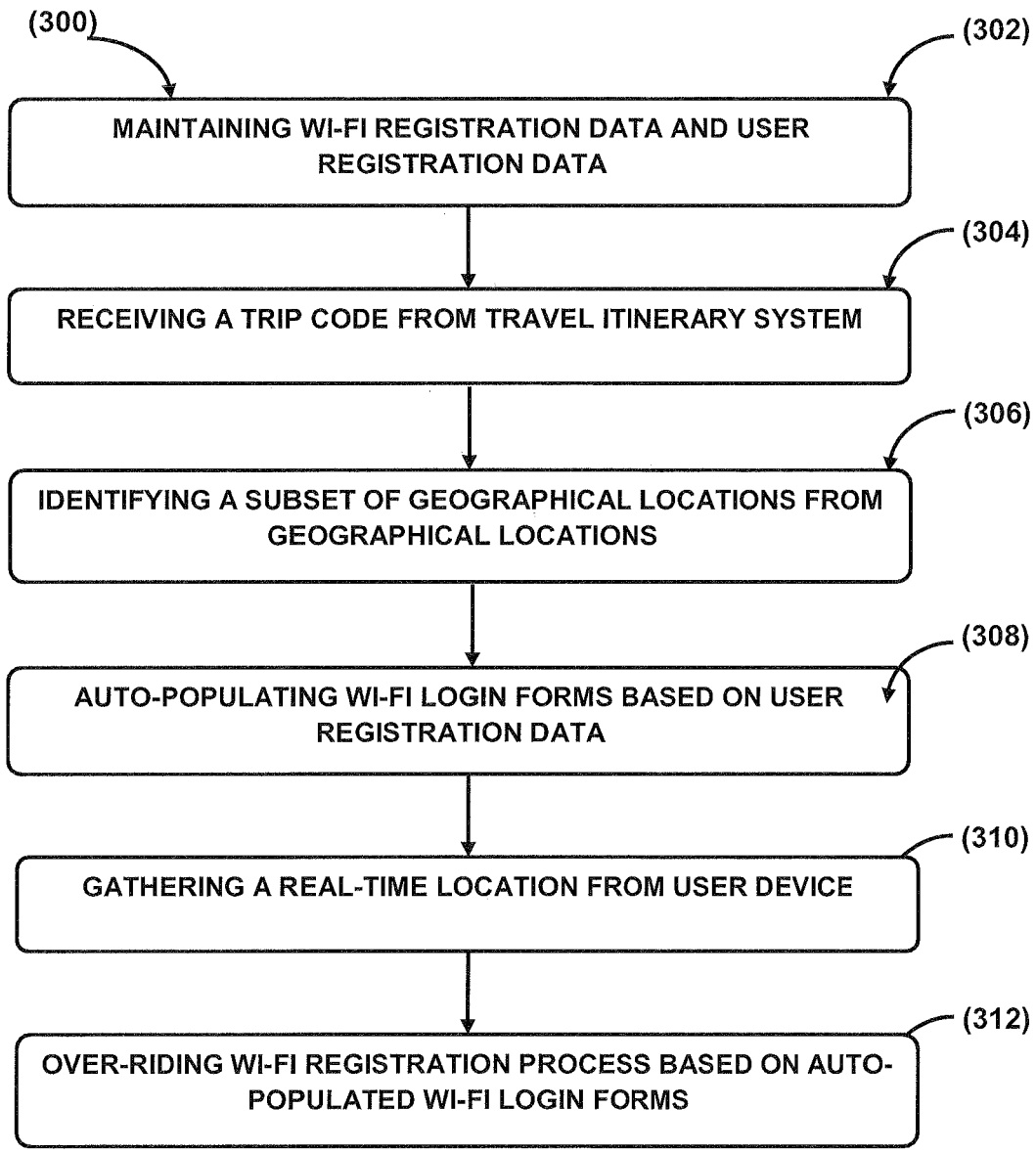
FIG. 3 illustrates a method for performing a remote pre-authentication operation of a user device for accessing network services of one or more wi-fi network providers, in accordance with an embodiment of the present subject matter.

Referring now to FIG. 3, a method 300 for facilitating remote pre-authentication of a user device for accessing network services of one or more wi-fi network providers is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the system 102.

At block 302, wi-fi registration data corresponding to the set of wi-fi network providers and user registration data corresponding to the set of users is maintained in the database. In one aspect, the wi-fi registration data may include the URL for login in the wi-fi service provider and user data may include name, surname and date of birth. In one embodiment, the wi-fi registration data and the user data may maintained by the data capturing module 212.

At block 304, the trip code generated by the travel itinerary system is received. In one aspect, the trip may correspond to the target user from the set of users and the set of travel bookings associated with the target user. In one embodiment, the receiving of the trip code may be performed by the receiving module 214.

At block 306, the subset of geographical locations from geographical locations is identified. In one aspect, the subset of geographical locations may correspond to the travel bookings associated with the target user. In one embodiment, the subset of geographical locations may be identified by the identifying module 216.

At block 308, a set of wi-fi login forms corresponding to the each wi-fi network provider associated with the travel bookings of the target user is auto-populated. In one embodiment, auto-population of the wi-fi login forms may be performed by the auto-populating module 218.

At block 310, the real-time location data from the user device of the target user is gathered. In one aspect, the real-time geographical location may correspond to the subset of geographical locations. In one embodiment, the real-time location data from the user device is gathered by the gathering module 220.

At block 312, an over-riding of the wi-fi registration process based on auto-populated wi-fi login forms is performed to enable the target user to access services of the target wi-fi network provider. In one aspect, wi-fi registration of the wi-fi network provider is associated with a target geographical location based on the auto-populated wi-fi log-in form associated with the target wi-fi network provider. In one embodiment, the wi-fi registration is performed by over-riding module 222.

Exemplary embodiments discussed above may provide certain advantages. Though not required to practice aspects of the disclosure, these advantages may include those provided by the following features.

Some embodiments enable a system and a method to facilitate remote pre-authentication of a user device for accessing network services of one or more wi-fi network providers.

Although implementations for methods and systems for facilitating remote pre-authentication of a user device for accessing network services of one or more wi-fi network providers have been described in language specific to structural features and/or methods, it is to be understood that the appended claims are not necessarily limited to the specific features or methods described. Rather, the specific features and methods are disclosed as examples of implementations for facilitating the remote pre-authentication of the user device for accessing network services of one or more wi-fi networks.

We claim:

1. A method for remote pre-authentication of a user device for accessing network services of one or more wi-fi network providers, the method comprising the steps of:
   maintaining, by a processor, wi-fi registration data corresponding to a set of wi-fi network providers and user registration data corresponding to a set of users of a database, wherein each wi-fi network provider corresponds to a geographical location from a set of geographical locations;
   receiving, by the processor, a trip code from a travel itinerary system, wherein the trip code corresponds to a target user from the set of users and a set of travel bookings associated with the target user;
   identifying, by the processor, a subset of geographical locations from the set of geographical locations associated with the set of travel bookings of the target user;
   auto-populating, by the processor, a set of wi-fi login forms corresponding to each wi-fi network provider associated with the subset of geographical locations, wherein the set of wi-fi login forms are auto-populated based on the user registration data;
   gathering, by the processor, real-time location data from a user device of the target user, wherein the real-time location data corresponds to a target geographical location from the subset of geographical locations; and
   overriding, by the processor, a wi-fi registration process of a target wi-fi network provider associated with the target geographical location based on the auto-populated wi-fi login form associated with the target wi-fi network provider to enable the target user to access services of the target wi-fi network.

2. The method of claim 1, wherein the set of travel bookings are analyzed to determine a travel duration corresponding to each geographical location from the sub-set of geographical locations, and wherein the travel duration corresponding to a target location is compared with real-time location data before over-riding the wi-fi registration process.

3. The method of claim 1, wherein the user registration data comprises a set of user defined policies.

4. The method of claim 1, further comprising the step of enabling a user to review and accept terms and conditions associated with the wi-fi network provider before auto-populating a set of wi-fi login forms corresponding to each wi-fi network provider associated with the subset of geographical locations.

5. The method of claim 1, wherein the real-time location data is gathered based on a travel duration of the trip code.

6. A system for remote pre-authentication of a user device for accessing network services of one or more wi-fi network providers, the system comprising:
- a processor,
- a memory coupled to the processor, wherein the processor is capable of executing a plurality of modules stored in the memory, and wherein the plurality of modules comprises:
- a data capturing module for maintaining wi-fi registration data corresponding to a set of wi-fi network providers and user registration data corresponding to a set of users of a database, wherein each wi-fi network provider corresponds to a geographical location from a set of geographical locations;
- a receiving module for receiving a trip code from a travel itinerary system, wherein the trip code corresponds to a target user from the set of users and a set of travel bookings associated with the target user;
- an identifying module for identifying a subset of geographical locations from a set of geographical locations associated with the set of travel bookings of the target user,
- an auto-populating module for auto-populating a set of wi-fi login forms corresponding to each wi-fi network provider associated with the subset of geographical locations, wherein the set of wi-fi login forms is auto-populated based on the user registration data;
- a gathering module for gathering real-time location data from a user device of the target user, wherein the real-time location data corresponds to a target geographical location from the subset of geographical locations; and
- an over-riding module for over-riding a wi-fi registration process of a target wi-fi network provider associated with the target geographical location based on the auto-populated wi-fi login forms associated with the target wi-fi network provider to enable the target user to access services of the target wi-fi network.

7. The system of claim 6, wherein the set of travel bookings are analyzed to determine a travel duration corresponding to each geographical location from the sub-set of geographical locations, and wherein the travel duration corresponding to target location is compared with real-time location data before over-riding the registration process.

8. The system of claim 6, wherein the user registration data comprises a set of user defined policies.

9. The system of claim 6, further comprising the step of enabling a user to review and accept terms and conditions associated with the wi-fi network provider before auto-populating a set of wi-fi login forms corresponding to each wi-fi network provider associated with the subset of geographical locations.

10. The system of claim 6, wherein the real-time location data is gathered based on a travel duration of the trip code.

11. A non-transitory computer readable medium embodying a program executable in a computing device for performing remote pre-authentication of a user device for accessing network services of one or more wi-fi network providers, the program comprising a program code:
- a program code for maintaining wi-fi registration data corresponding to a set of wi-fi network providers and user registration data corresponding to a set of users of a database, wherein each wi-fi network provider corresponds to a geographical location from a set of geographical locations;
- a program code for receiving a trip code from a travel itinerary system, wherein the trip code corresponds to a target user from the set of users and a set of travel bookings associated with the target user;
- a program code for identifying a subset of geographical locations from a set of geographical locations associated with the set of travel bookings of the target user;
- a program for auto-populating a set of wi-fi login forms corresponding to each wi-fi service provider associated with the subset of geographical locations, wherein the set of wi-fi login forms is auto-populated based on the user registration data;
- a program code for gathering real-time location data from a user device of the target user, wherein the real-time location data corresponds to a target geographical location from the subset of geographical locations; and
- a program for over-riding a wi-fi registration process of a target wi-fi network provider associated with the target geographical location based on the auto-populated wi-fi login form associated with the target wi-fi network provider to enable the target user to access services of the target wi-fi network.

* * * * *